United States Patent [19]
Streander

[11] 3,730,631
[45] May 1, 1973

[54] ANGLE GAUGE

[75] Inventor: George W. Streander, Alamogordo, N. Mex.

[73] Assignee: Design Systems, Inc., Alamogordo, N. Mex.

[22] Filed: Sept. 20, 1971

[21] Appl. No.: 181,861

[52] U.S. Cl. ..................356/150, 33/112, 33/174
[51] Int. Cl. ................................................G01b 1/00
[58] Field of Search..............................356/138, 150; 33/112, 227, 174

[56] References Cited

UNITED STATES PATENTS

| 2,461,166 | 2/1949 | Luboshez | 356/138 |
| 2,835,978 | 5/1958 | Krisel | 33/112 |

Primary Examiner—Edward S. Bauer
Attorney—Clarence A. O'Brien and Harvey B. Jacobson

[57] ABSTRACT

A corner angle testing body including a panel member having a notch formed therein defined by a pair of relatively angulated plane surfaces defining a desired included angle therebetween. The panel member further includes an enlargement of the apex portion of the notch adjacent and extending about the point of intersection of the plane surfaces defining the notch and one side of the panel member is provided with a plane partial annular light-reflective surface extending about and concentric with the point of intersection of the plane surfaces defining the notch and the light-reflective surface is disposed normal to the notch-defining plane surfaces or edges.

6 Claims, 4 Drawing Figures

PATENTED MAY 1 1973
3,730,631
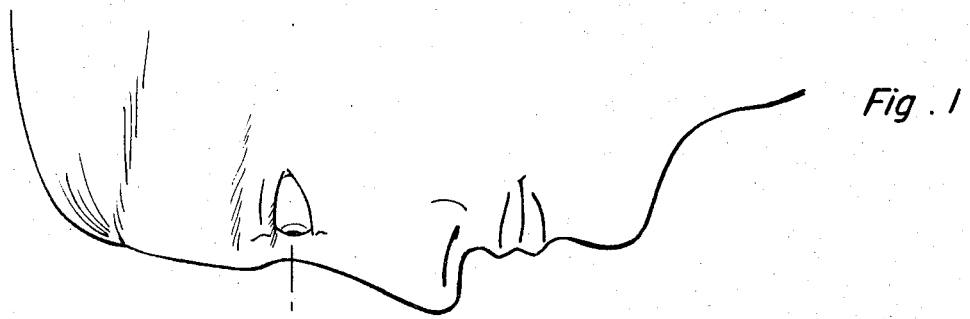
Fig. 1
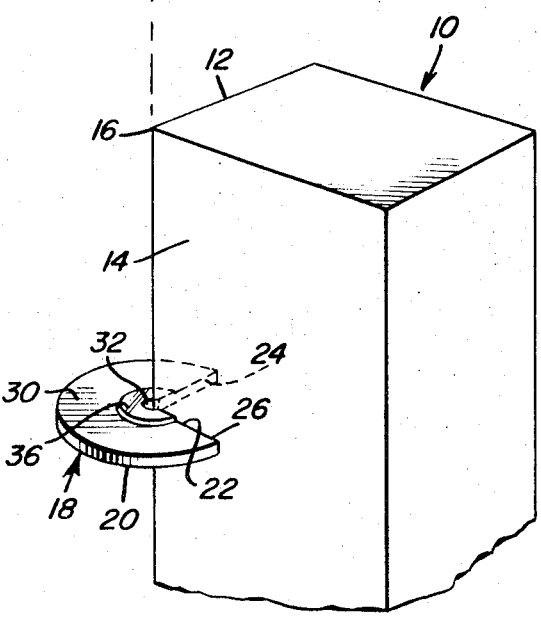
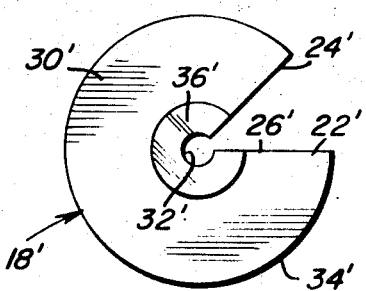
Fig. 4
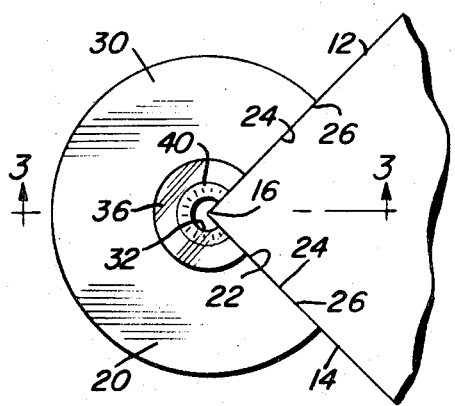
Fig. 2
Fig. 3
George W. Streander
INVENTOR.
BY Clarence A. O'Brien
and Harvey B. Jacobson
Attorneys

ANGLE GAUGE

The angle gauge of the instant invention has been designed to provide a means whereby the angle formed by a pair of relatively angulated intersecting plane surface may be visually checked for accuracy within quite close tolerances.

Inasmuch as the gauge is designed to render a visual indication of close tolerances by even persons unskilled in the use of conventional precision measuring gauges, it is of one-piece construction and includes no moving parts. Accordingly, the gauge is designed to function primarily in conjunction with production line work inasmuch as each gauge will be operative to measure only a single angle.

The main object of this invention is to provide a gauge that may be utilized by unskilled workmen to obtain a visual indication of the angle defined between a pair of relatively inclined and intersecting plane surfaces.

Another object of this invention is to provide a gauge in accordance with the preceding object and of one-piece construction with no movable parts whereby the gauge will be capable of repeatedly accurately measuring the angle defined between two relatively inclined and intersecting plane surfaces without the gauge being continuously handled in a delicate manner.

A final object of this invention to be specifically enumerated herein is to provide an angle gauge which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the angle gauge in use with the user of the gauge gauging the angle between two adjacent sides of an elongated workpiece which is substantially rectangular in cross-sectional shape;

FIG. 2 is a top plan view of the assemblage illustrated in FIG. 1 and with a portion of the workpiece being broken away;

FIG. 3 is a fragmentary vertical sectional view taken substantially upon the plane indicated by the section line 3—3 of FIG. 2; and FIG. 4 is a plan view of the gauge.

Referring now more specifically to the drawings, the numeral 10 generally designates a workpiece including a pair of relatively angulated and intersecting plane surfaces 12 and 14 defining a right-angle corner 16.

The gauge of the instant invention is referred to in general by the reference numeral 18 and comprises a panel-like body 20 which is generally circular in plane shape. The body 20 has a wedge-shaped sector thereof removed forming a notch 22 defined between radially extending edges 24 and 26.

One side 28 of the body 20 is planar and the edges 26 and 24 are disposed at right angles relative to the side 28. Further, the opposite side or surface 30 of the body 20 is also planar, except in its central portion, and parallels the surface or side 28.

The central portion of the body 20 is provided with a cylindrical bore or opening 32 whose center axis is disposed normal to the surfaces 28 and 30 and into which the notch 22 opens. The center axis of the bore 32 coincides with the center of curvature of the cylindrical outer periphery 34 of the body 20 and the central area of the side 30 includes a slightly outwardly displaced planar annular surface 36 concentric with the bore 32 and the surface 36 is polished to define a near optically perfect plane mirror surface.

The diameter of the center bore or opening 32 is equal to one-half the diameter of the iris of the human eye and therefore when the surface 36 is viewed at close range by the eye of a user of the gauge 18, when the surface 36 is disposed normal to the line of sight of the user, the reflected image 40 of the eye outwardly of the iris may be viewed immediately outwardly of the bore or opening 32. On the other hand, should the surface be even slightly inclined relative to a position normal to the line of sight, at least a partial image of the iris will be seen, the angular area of view being double the angle error of the gauge 18. Accordingly, in checking the angulation of the corner 16 of the workpiece 10, the user of the gauge 18 places the latter on the corner 16 with the edges 24 and 26 against the surfaces 12 and 14 of the workpiece 10 and sights along the corner apex with the reflected image 40 of the outer portion of his eye concentrically disposed relative to the bore or opening 32. In this manner, with the user sighting along the corner 16 and the image 40 centered relative to the bore or opening 32 the gauge 18 is correctly positioned with the surfaces 28, 30 and 36 disposed normal to the surfaces or sides 12 and 14 and therefore with the edges 24 and 26 paralleling the surfaces or sides 12 and 14. With the gauge 18 thus positioned and held stationarily in position, any deviation between the angle defined between the sides 12 and 14 and the angle defined between the edges 24 and 26 may be visually ascertained.

With attention now invited more specifically to FIG. 4 of the drawings, there will be seen a second gauge 18' which is substantially identical to the gauge 18 and which therefore has its parts corresponding to the various components of the gauge 18 designated by corresponding prime numerals. The only difference between the gauge 18' and the gauge 18 is that the edges 24' and 26' define a 45° corner as opposed to a 90° corner and therefore the gauge 18' is adapted to check a 45° corner of a workpiece.

The gauge 18 is partial circular in shape in order that heat from the hand supporting the gauge or heat from any other source will be more evenly distributed throughout the gauge 18, thus maintaining the accuracy of the gauge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An angle testing gauge comprising a body having a pair of relatively angulated straight edges convergent toward a point and disposed in a single plane, said body defining a partially circular sight passage therethrough bound by circular edge portions of said body, said sight passage having radii intersecting at said point and paralleling said plane, said body including a planar partial annular mirror side surface paralleling said radii and concentric relative to said point, the radii of said passage being less than the radius of the iris of a human eye.

2. The combination of claim 1 wherein the radius of the circular path along which the outer periphery of said partial annular mirror side surface extends is greater than the radius of the iris of a human eye.

3. The combination of claim 1 wherein said body is panel-like in configuration and said relatively angulated straight edges comprise peripheral edge portions of said panel-like body.

4. An angle testing gauge comprising a body having a pair of relatively angulated straight edges convergent toward a point and disposed in the same plane, said body defining a sight passage therethrough generally centered relative to said point, said body including a planar partial annular mirror side surface paralleling said plane and concentric relative to said point, the radii of the circular path along which the outer peripheral portion of said planar annular mirror side surface extends being at least slightly greater than the radius of the iris of a human eye.

5. The combination of claim 4 wherein said body includes generally parallel opposite side surfaces, said planar annular mirror side surface being laterally displaced outwardly of one of said opposite side surfaces.

6. The combination of claim 1 wherein the radii of said passages are one-half the radius of the iris of a human eye.

* * * * *